J. F. WINDHORST.
CULTIVATING IMPLEMENT.
APPLICATION FILED FEB. 23, 1910.
963,102. Patented July 5, 1910.
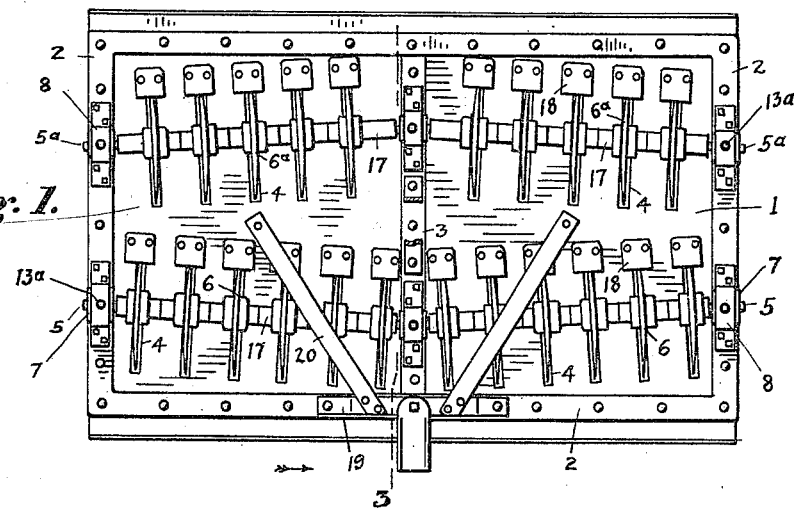
Fig. 1.
plate through which disks extend
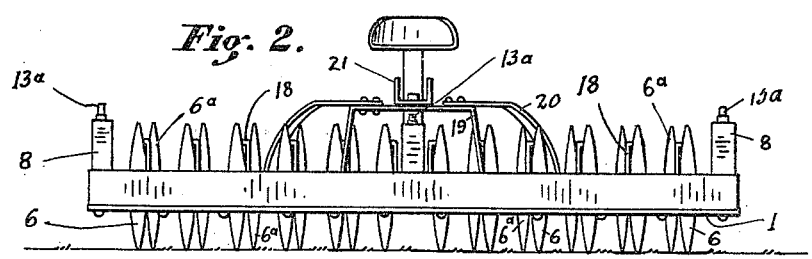
Fig. 2.
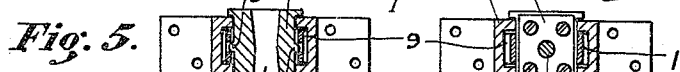
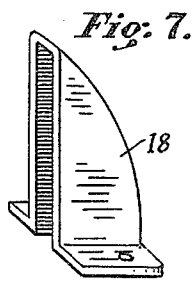
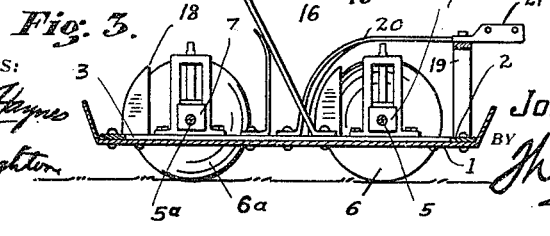
WITNESSES:
INVENTOR
JOHN F. WINDHORST.
BY
ATTORNEY

UNITED STATES PATENT OFFICE.

JOHN F. WINDHORST, OF SEYMOUR, INDIANA.

CULTIVATING IMPLEMENT.

963,102.  Specification of Letters Patent.  Patented July 5, 1910.

Application filed February 23, 1910. Serial No. 545,307.

*To all whom it may concern:*

Be it known that I, JOHN F. WINDHORST, a citizen of the United States, and a resident of the city of Seymour, in the county of Jackson and State of Indiana, have invented new and useful Improvements in Cultivating Implements, of which invention the following is a specification.

This invention relates to improvements in cultivating implements of that class known as harrows, and in which groups or series of cutting disks are carried by a suitable frame in such manner that when the machine is drawn over the ground the disks will operate to cut into and break up the soil.

I am aware that cultivating implements have been heretofore devised wherein pairs of shafts carrying the disks have been arranged out of parallel alinement, the disks of the rear pair of shafts being alternated with those of the front pair of shafts, and the objects of my invention are to provide, in a mechanism having the disks carried and arranged generally in the manner referred to, certain elements and parts to operate in combination therewith whereby the soil may be cultivated rapidly and effectively, and whereby the machine is capable of being adjusted to harrow or cultivate the soil to different depths.

More specific purposes of my invention are to provide a machine of the kind described which will be economical of construction, easy of manipulation and control, and which will be strong and durable and not liable to get out of repair or adjustment.

To the foregoing ends my invention consists of the new and improved combination, construction and arrangement of parts and of the details of construction, as described herein and defined by the appended claims and illustrated in the accompanying drawings.

The several parts of my invention are designated throughout the several views in the drawings by similar characters of reference.

In the drawings, Figure 1 is a plan view, and Fig. 2 is a front view of my improved cultivating implement, the seat being not shown. Fig. 3 is a transverse vertical sectional view taken on the line 3 and as viewed in the direction indicated by the arrow in Fig. 1. Fig. 4 is an enlarged sectional view of one of the supports. Fig. 5 is a horizontal transverse sectional view taken on the line 5—5 in Fig. 4. Fig. 6 is a horizontal transverse sectional view taken on the line 6—6 in Fig. 4. Fig. 7 is an enlarged perspective view of one of the disk shields. Fig. 8 is a longitudinal sectional view of a portion of the line shaft and its connection with the boxing that is retained in the support.

To effect the more complete breaking or cultivating of the soil by the disks than has heretofore been accomplished by machines of this general character I have arranged a plate to be supported transversely of the disks and at an elevation above the lower portion of the disks, the plate having slots through which the disks may move freely. The function performed by the plate so arranged is to prevent the larger fragments or clods of earth that are broken loose by the disks, from escaping without being further reduced or broken up.

In the preferable form of machine shown herein, for carrying my invention into effect, the thin metal plate 1 which is stiffened by having the frame 2 riveted to its edges and the central bar 3 thereof riveted to its middle portion, is provided with the slots 4 through which will extend the portion of the disks that are below the center lines of the line shafts. The arrangement of the line shafts which for convenience in description and reference to hereinafter, I will designate as 5 and $5^a$, and of the disks, which for a similar reason I will designate as 6 and $6^a$, is plainly shown in Fig. 1. The ends of these shafts are disposed pivotally in boxings 7; these boxings are retained and are capable of being moved to and held at different heights in the supports 8. These supports are similar in structure and they are secured to the frame at the positions as shown, the inner ends of the line shafts being carried in the boxings of the centrally disposed supports and the outer ends of the line shafts being carried in the boxings of the supports at the ends of the frame. By this combination and arrangement of parts, the machine is capable of being adjusted to fulfil requirements demanded by soil of varying character and condition. To afford simple, strong and effective means for supporting adjustably the said plate 1, the details illustrated in Fig. 4 have been devised. The legs of the support are provided with the continuous interior grooves 9. Seated in these grooves are the spring-bars 10 having the series of holes 11 therein. The boxing 7 disposed between the said legs has the lateral lips 7ª which will engage the edges of the legs and prevent transverse displacement of the boxing. On the opposite interior faces of this boxing are the blunt projections 9ª which will engage the holes 11 of the spring-bars. The transverse hole 12 in the boxing is of decreased diameter at its center whereby a practical bearing for the end of the line shaft which enters same at an angle will be afforded.

The screw 13 which will work in a threaded hole therefor in the top of the support has the bottom head 14 which will be free to rotate in a recess therefor in the top of the boxing. This head 14 will be held in place by the plate 15 in the bore of which plate the screw is free to move rotatively and which plate is secured to the top of the boxing by the suitable screws 16. The screw 13 which will need to be operated only occasionally, is provided with the angular head 13ª to which a wrench may be applied. A hand wheel could be used as well. By manipulation of the screw 13 the raising or lowering of the boxing may be easily accomplished; the spring-bars acting to snap into engagement with the projections 9 render unnecessary the exercise of any skill in adjusting the position of the boxing. At the same time vibration or shaking of the boxing will be prevented and locking means to hold the screw 13 against movement is rendered unnecessary. The parts may be easily assembled and will be not liable to breakage or derangement.

The disks are made of steel and are of the concavo-convex structure and form as shown in Fig. 8, and are mounted loosely on the line shafts. The line shafts 5 being arranged convergent to, and the line shafts 5ª being arranged divergent from the rear of the machine, and the disks 6 and 6ª being arranged on the shafts respectively in the different reverse directions, and so that one series alternates with the other series, it is obvious that as the machine is drawn over the ground the entire area of soil that is covered by the machine will be operated upon.

To prevent such dirt as may adhere to the disks, from working up through the slots and settling on the plate 1 there is secured on the plate at each disk a cast metal shield 18 of the form and structure plainly shown in Fig. 7. The frontal and rear edges of the plate 1 are bent upwardly to prevent the breaking of the dirt lumps or clods over the edge of the frame. Supported on the upright 19 which is braced by the bars 20, is a block 21 of structure and form suitable to receive the end of a draft member. A seat for the operator may be provided as shown in Fig. 3.

What I claim as my invention, and desire to secure by Letters Patent, is:

1. In a machine of the kind described, the combination of a line shaft, a series of disks thereon, a plate supported by the said line shaft and having slots through which the disks will extend, means to move and to hold the plate at different heights.

2. In a machine of the kind described, the combination of a line shaft, a series of disks thereon, a boxing for each end of the line shaft, a plate having slots through which the disks will extend, supports on said plate, means between the supports and the boxings whereby the latter may be moved to and held at different heights.

3. In a machine of the kind described, the combination of a line shaft, a series of disks thereon, a boxing for each end of the line shaft, a plate having slots through which the disks extend, supports mounted on the said plate and in which the boxings are vertically movable, a member between the support and the boxing to raise and lower the latter, means carried by the supports to hold the boxings at different positions in the supports.

4. In a machine of the kind described, the combination of a plate, supports thereon, boxings carried by the supports, a front pair of line shafts arranged divergent to, and a rear pair of shafts arranged convergent from the rear of the plate and having their ends journaled in the said boxings, series of spaced disks loosely supported on the said shafts there being slots in the said plate through which the disks extend, means to move and to hold the boxings in different vertical positions.

5. In a machine of the kind described, a plate, supports thereon, line shafts arranged divergent to and convergent from the rear of the plate and having their ends journaled in the said supports, series of spaced disks carried by the said shafts, there being slots in the plate through which the disks extend.

6. In a machine of the kind described, the combination of a line shaft to support a series of disks substantially as described, a plate having slots through which the disks extend, supports on said plate having vertical slots therein, boxings for the line shafts vertically movable in the slots of said supports and having blunt projections on their opposite interior sides, spring bars contained in said supports which press against the said interior sides of the boxings and which spring-bars are provided with holes to engage the said blunt projections, means to raise and to lower the boxings in said supports.

In testimony whereof I have hereunto signed my name to this specification, in the presence of two subscribing witnesses.

JOHN F. WINDHORST.

Witnesses:
SIMON HUMFELD,
THOMAS L. RYAN.